Patented Mar. 19, 1935

1,994,467

UNITED STATES PATENT OFFICE 1,994,467

SALT OF POLYHYDROXY AMINES WITH ORGANIC ACIDS, AND PROCESS FOR PREPARING SAME

Robert B. Flint and Paul L. Salzberg, Wilmington, Del., assignors to E. I. du Pont de Nemours & Company, Wilmington, Del., a corporation of Delaware No Drawing. Application September 27, 1932, Serial No. 635,046

18 Claims. (Cl. 260—112)

This invention relates to new compositions of matter, and to processes for preparing same. It refers more particularly to novel soaps prepared by commingling organic acids and amino alcohols. An object of the invention relates to the preparation of novel soaps having a high detergent, emulsifying and cleansing action. A more specific object resides in the preparation of salts formed by the combination of carboxylic, sulfonic, or sulfonated carboxylic acids containing at least 8 carbons in the molecule with amino alcohols in which the hydroxylated radical is an open-chain radical containing at least 5 carbon atoms and having a hydroxyl group attached to each carbon with the exception that to which the amino group is attached. Other objects of the invention will appear evident from the following description of the invention.

The amino alcohols used in accordance with the present invention, may be prepared according to the procedure outlined in our copending application Serial No. 635,045, filed September 27, 1932. The general mode of preparing the amino alcohols as described in the said copending case comprises contacting hydrogen, either by a static or dynamic process, through a mixture of a sugar and an amine at a pressure of at least 15 atmospheres (absolute) and at a temperature of between 50°–125° C. in the presence of a nickel catalyst. This mode of preparation is illustrated in the following examples:

*Example A.*—One hundred grams of commercial glucose, 80 grams of water and 80 grams of monomethylamine were charged into a pressure vessel with 9 grams of a reduced nickel catalyst comprising 20% reduced nickel supported on kieselguhr. Hydrogen was introduced to a pressure of 2000 lbs. and the vessel was agitated vigorously during the heating. Hydrogen absorption began at 100° C. and was complete in 15 minutes, the temperature attaining a maximum of 120° C. during this time. The product was separated from the catalytic material by filtration and the filtrate evaporated until crystallization occurred. Methylglucamine could be recrystallized from this residue as a white solid melting at 127–128° C.

*Example B.*—Seventy-five grams of commercial glucose and 200 cc. of 30% aqueous dimethylamine solution were charged into a pressure vessel with seven grams of a reduced nickel catalyst comprising 20% reduced nickel supported on kieselguhr. Hydrogen was introduced to a pressure of 2000 lbs. and the vessel was agitated vigorously while being heated. Hydrogen absorption began at 105° C. and was complete in 10 minutes, the temperature attaining a maximum of 120° C. during this time. The product was separated from the catalytic material by filtration and the filtrate evaporated. A viscous syrup of basic nature was obtained as reaction product.

*Example C.*—One hundred grams of xylose and 100 grams of monomethylamine dissolved in 100 grams of water were charged into a pressure vessel at approximately room temperature with 10 grams of a reduced nickel catalyst comprising 20% of reduced nickel supported on kieselguhr. Hydrogen was introduced to a pressure of 2000 pounds and the vessel and the mixture gradually heated with vigorous agitation. Hydrogen absorption began at 90° C. and was complete in 45 minutes, the temperature attaining a maximum of 100° C. during this time. The product was separated from the catalytic material by filtration and the filtrate evaporated. Methylxylamine was obtained as a viscous, non-crystalline syrup which by titration with hydrochloric acid gave a molecular weight of 168 as compared with a calculated molecular weight of 165.

*Example D.*—Fifty grams xylose, 98 grams of monobutylamine, 70 grams of water and 5 grams of a catalyst comprising 20% reduced nickel supported on kieselguhr were shaken vigorously in a pressure vessel under 1800 pounds hydrogen pressure. When heat was applied, absorption of hydrogen began at 90° C. and was complete in 50 minutes with the temperature reaching a maximum of 100°. The product was separated from the catalytic material by filtration and the filtrate evaporated. Butylxylamine was obtained as a viscous, non-crystalline syrup which by titration with HCl gave a molecular weight of 213 as compared with a calculated molecular weight of 207.

*Example E.*—Eighty-four grams of commercial glucose, 228 grams of 33% aqueous monoethylamine solution and 8 grams of a catalyst comprising 20% reduced nickel supported on kieselguhr were shaken vigorously in a pressure vessel under 1500 pounds hydrogen pressure. When heat was applied, absorption of hydrogen began at 90° C. and was complete in two hours with the temperature reaching a maximum of 100° C. The product was separated from the catalytic material by filtration and the filtrate evaporated. Ethylglucamine was obtained as a white crystalline solid melting at 133–134° C., which by titration with hydrochloric acid, gave a molecular weight of 209, which is the calculated value.

*Example F.*—One hundred grams of commercial glucose, 94 grams of monoethanolamine, 94 grams of water and 10 grams of a nickel catalyst comprising 20% reduced nickel supported on kieselguhr were shaken vigorously in a pressure vessel under 2000 pounds hydrogen pressure. When heat was applied absorption of hydrogen began at 90° C. and was complete in 45 minutes with the temperature reaching a maximum of 110° C. The product was separated from the catalytic material by filtration and the filtrate evaporated. Hydroxyethylglucamine was obtained as a viscous, non-crystalline syrup.

*Example G.*—One hundred grams of galactose, 80 grams of monomethylamine, 80 grams of water and 10 grams of a catalyst comprising 20% reduced nickel supported on gieselguhr were shaken vigorously in a pressure vessel under 2300 pounds hydrogen pressure. When heat was applied, absorption of hydrogen began at 55° C. and was complete in 45 minutes with the temperature reaching a maximum of 80° C. The product was separated from the catalytic material by filtration and the filtrate evaporated. Methylgalactamine was obtained as a white crystalline solid melting at 127–128° C. which by titration with hydrochloric acid gave a molecular weight of 187 as compared with a calculated value of 195.

*Example H.*—One hundred grams of crystalline fructose, 80 grams of monomethylamine, 80 grams of water and 10 grams of a catalyst comprising 20% reduced nickel supported on kieselguhr were shaken vigorously in a pressure vessel under 1700 pounds hydrogen pressure. When heat was applied, absorption of hydrogen began at 80° C. and was complete in 75 minutes with the temperature reaching a maximum of 100°. The product was separated from the catalytic material by filtration and the filtrate evaporated. Methylfructamine was obtained as a viscous, non-crystalline syrup.

Salts of amino alcohols can be prepared by direct combination of the organic acid with the organic base. If the fatty acid is a solid, the preparation is aided by the application of heat. When preparing products obtained from the sulfonated fatty acids we may proceed as follows: The acid product of the mixture of the sulfonated unsaturated acids as obtained in the well known manner by the action of fuming sulfuric acid on an unsaturated oil such as castor oil, is freed of mineral acid by washing. It is then freed of water either by settling or by any other suitable means, and then enough of the base is added at ordinary temperature to neutralize the acidity of the sulfonic acid group, or of both the sulfonic acid and the carboxylic acid groups. The following examples will serve to illustrate our preferred method of procedure.

*Example 1.*—Two hundred eighty-two parts of free oleic acid are mixed with 181 parts of glucamine, at room temperature, the reaction proceeding spontaneously.

The product resulting from this procedure is semi-solid, and is ready for use without further treatment.

*Example 2.* Two hundred eighty-four parts of stearic acid are melted. Into the melt are stirred: 151 parts xylamine, the stirring continued at a temperature of about 80° C. until the mixture is uniform.

The resultant product, on cooling, is a solid.

*Example 3.*—Two hundred eighty-two parts of free oleic acid are mixed with 195 parts of methylglucamine.

This product is a semi-solid and ready for use without further treatment.

*Example 4.*—Two parts of a crude sulfonated oil made by the action of sulfuric acid on castor oil are mixed with one part glucamine.

The product is ready for use without further treatment, and disperses readily in water.

In the above examples any one of the bases may be used alone or in mixture. The acids may also be varied. Other acids which may be used in the process of this invention include lauric, behenic, hydroxy stearic, coconut oil acids, elaidic, erucic, brassidic, eleostearic, China wood oil acids, stearolic, linolic, linolenic, linseed oil acids, behenolic, ricinoleic, castor oil acids, sulfated higher alcohols such as lauryl and stearyl sulfate, sulfonated fish oil, sulfonated mineral oils, alkyl naphthalene sulfonic acids, sulfonated oxidized mineral oils, the so-called mahogany sulfonic acids, sulfonated abietenes, hydroxy sulfonic acids, abietic acid, resins of high acid number such as glyptals, acid phthalic esters of fatty acid glycerides, etc.

Other amines that may be used include arabinamine, mannamine, galactamine, methylglucamine, ethylglucamine, n-butylglucamine, isobutylglucamine, laurylglucamine, methylxylamine, ethylxylamine, butylxylamine, dimethylfructamine, etc.

The method for the preparation of these salts is capable of variation. A water solution of the base may be reacted directly with the fatty acid when the latter is a liquid. It is also possible to start from the glycerides of the fatty acids, i. e., olive oil, cottonseed oil, castor oil, linseed oil, and the like by saponifying the glycerides by heating with the base to a high temperature. Variations in proportions of the reactants may be employed, i. e. an excess of the base or an excess of the acid as desired.

These salts may be used as detergents, emulsifying agents for insecticides, emulsifying agents for waxes in polishing and water-proofing compositions, in cosmetics, shaving creams, shampoos, etc., in the preparation of soluble mineral oils, in textile lubrication, etc.

An advantage of this invention is that it furnishes products, essentially organic soaps, which possess excellent dispersing power for organic substances. They possess the detergent property of soaps without the high alkalinity characteristics of the sodium or potassium soaps of the fatty acids. The amines from which the soaps are formed possess the desirable property of non-volatility and thus have an advantage over ammonia and the alkyl amines during the preparation of the soaps. Certain of these soaps, particularly those prepared from glucamine or methyl glucamine, have a decided advantage in cost over the soaps from the more expensive ethanolamines.

The above description and examples are to be taken as illustrative only and not as limiting the scope of the invention. Any modification or variation therefrom which conforms to the spirit of the invention is intended to be included within the scope of the claims.

We claim:

1. The salt resulting from the reaction of an amino alcohol in which the hydroxylated radical is a normal open-chain radical containing at least 5 carbon atoms and having a hydroxyl group on each carbon excepting that to which nitrogen is attached, and a member of the group consisting of carboxylic, sulfonic or sulfonated carboxylic acids containing at least 8 carbon atoms in the molecule.

2. The salt resulting from the reaction between an amino alcohol in which the hydroxylated radical is a normal open-chain radical containing at least 5 carbon atoms and having a hydroxyl group on each carbon excepting that to which nitrogen is attached, and a carboxylic acid containing at least 8 carbon atoms.

3. The salt described in claim 2 in which the carboxylic acid contains 18 carbon atoms.

4. Glucamine salts of fatty acids containing at least 8 carbon atoms.

5. Xylamine salts of fatty acids containing at least 8 carbon atoms.

6. Glucamine salts of fatty acids containing at least 8 carbon atoms.

7. Xylamine salts of fatty acids containing 18 carbon atoms.

8. Glucamine oleate.

9. The process of making a salt which comprises reacting an amino alcohol in which the hydroxylated radical is a normal open-chain radical containing at least 5 carbon atoms and having a hydroxyl group on each carbon excepting that to which nitrogen is attached, and an organic acid taken from the group consisting of carboxylic, sulfonic, or sulfonated carboxylic acids containing at least 8 carbon atoms in the molecule.

10. Methylglucamine stearate.

11. The process of making a salt which comprises reacting an amino alcohol in which the hydroxylated radical is a normal open-chain radical containing at least 5 carbon atoms and having a hydroxyl group on each carbon excepting that to which nitrogen is attached, and a carboxylic acid containing at least 8 carbon atoms.

12. The process of claim 11 characterized in that the amino alcohol is glucamine.

13. The process of claim 11 characterized in that the amino alcohol is glucamine and the carboxylic acid contains 18 carbon atoms.

14. The process of claim 11 characterized in that the amino alcohol is glucamine and the carboxylic acid is oleic acid.

15. The process of claim 11 in which the amino alcohol is methyl glucamine and the carboxylic acid is stearic acid.

16. The process of claim 11 characterized in that the amino alcohol is xylamine.

17. The process of claim 11 characterized in that the amino alcohol is xylamine and the carboxylic acid contains 18 carbon atoms.

18. The process of claim 11 in which the carboxylic acid contains 18 carbon atoms.

ROBERT B. FLINT,
PAUL L. SALZBERG.